Jan. 29, 1957  H. I. MYER ET AL  2,779,310
DAIRY STABLE SANITATION EQUIPMENT
Filed Aug. 12, 1953
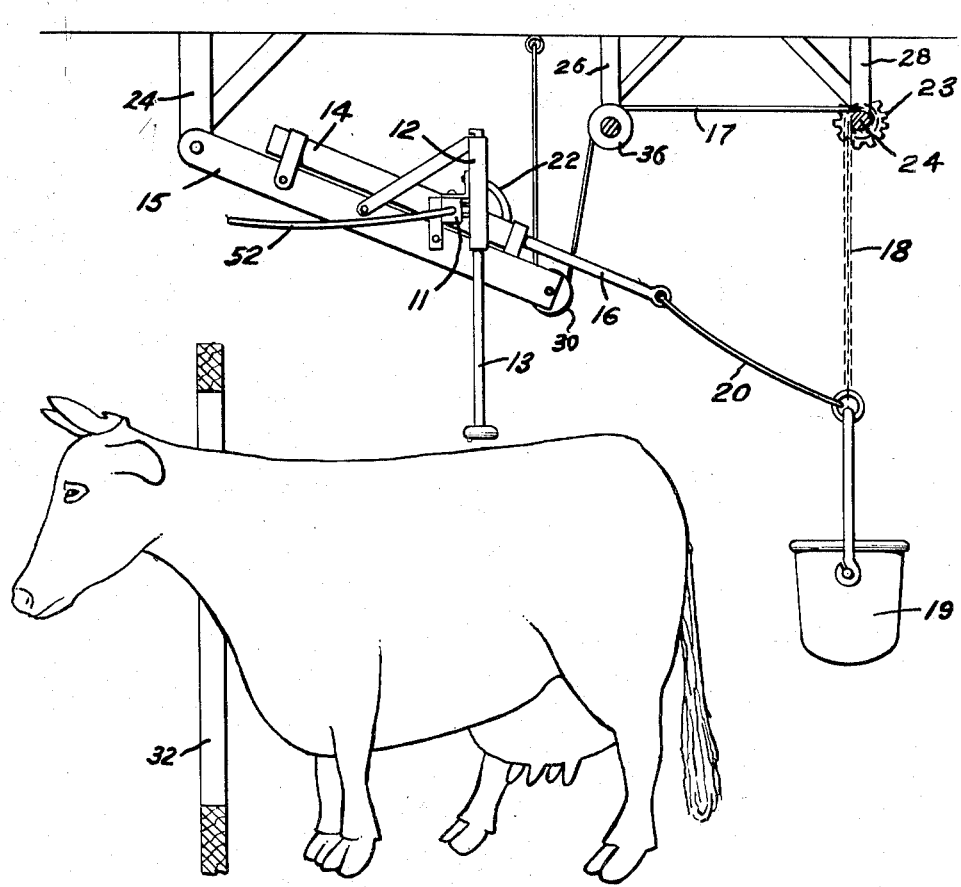
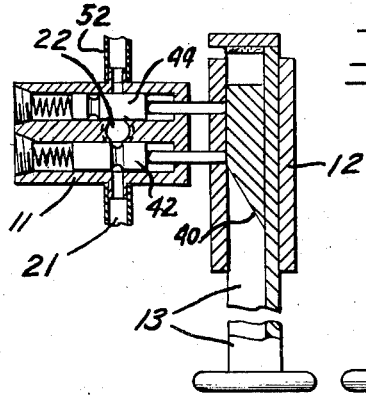
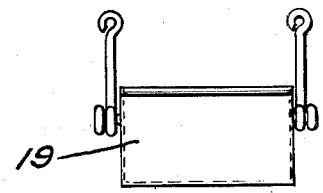
INVENTORS.
Howard I. Myer and Fred C. Myer.
BY
ATTORNEY.

United States Patent Office 2,779,310
Patented Jan. 29, 1957

2,779,310

DAIRY STABLE SANITATION EQUIPMENT

Howard I. Myer, Fulton, N. Y., and Fred C. Myer, Punta Gorda, Fla.

Application August 12, 1953, Serial No. 373,754

4 Claims. (Cl. 119—27)

This invention relates to apparatus for the sanitary disposition of animal excretions particularly applicable to maintaining cleanliness in dairy stables.

The invention more particularly is directed to apparatus adapted to prevent excretion from cows from being deposited on the stable floor, and comprises apparatus for receiving such excretion for sanitary disposition, such apparatus being brought into operation by sensing apparatus dependent upon the animal's reflex action of arching its back immediately prior to excretion. The apparatus is further adapted to be lifted out of the way to permit free ingress and egress of the animal from the stall, and to provide convenient handling of the waste in a sanitary manner.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevational view with parts in section of the apparatus applied to one stall;

Figure 2 is an enlarged sectional detail view of the valve actuating and sensing mechanism of Figure 1;

Figure 3 is an enlarged end view of the lower portion of the sensing mechanism of Figure 2; and Figure 4 is a fragmentary end view showing the receiver of Figure 1.

Referring to the drawings, there is shown a stall which may be one of a series of parallelly disposed stalls in a stable, there being animal confining means such as 32, to confine the animal to a suitable position in relation to each stall of the apparatus. Suspended from the ceiling of each stall are brackets 24, 26 and 28. Pivotally attached to the bracket 24, is a support arm 15, having at its free end a pulley 30. A flexible cable 17 having one end affixed to the ceiling as at 34 extends around the pulley, and over a pulley 36 supported from the bracket 26. The cable extends to a drum shaft 24, journalled in a bracket 23. The shaft 24 may extend along the length of the stable to serve all of the stalls, and as many brackets 28 as necessary provided. The drum shaft serves to elevate or lower the free end of the arm 15.

Mounted on the arm 15 is an air cylinder 14 and a valve 11 and sensory apparatus 12 and 13 respectively. The cylinder has a piston (not shown) and a piston rod 16, which is adapted to be moved to the left, as shown in Figure 1 when air under pressure is admitted to the right hand end of the cylinder.

A hopper or receiver 19 is suspended from the drum shaft 24 by spaced chains, such as 18, and rotation of the drum shaft to raise the arm 15, also raises the hopper, such operation being adapted to lift the arm and hopper clear of the stall to allow free ingress and egress of the animal therefrom, or to lift the hopper to a convenient height for dumping into a conveyance. The shaft 24 is provided with a sprocket or gear 23, for power or manual operation.

The valve apparatus is rigidly attached to the arm 15, and comprises a substantially vertical guide way 12, in which there is slidably mounted a vertical bar or trip rod 13, the lower end of which is provided with a transverse member 38 adapted to bridge across a region or area above the stall and above the back of an animal confined therein. The height of the member 38 will be adjusted by raising or lowering the arm 15, so as to be positioned normally just above the animal's back.

The upper end of the bar 13 is provided with a cam 40 adapted to actuate the slide valves 42 and 44 in the valve apparatus 11. The valve 42 is shown in position to exhaust the cylinder, the cylinder being connected to the valve by the port and hose connection 22, exhaust to atmosphere being effected through port 21. A source of fluid pressure 52 is adapted to be connected to the connection 22 to the cylinder, when the valve 44 is actuated. When the cam 40 is lifted, the exhaust valve 42 moves to the right under spring pressure, and as the cam is lifted further the valve 44 moves to the right to admit pressure to the right hand end of cylinder 14, causing piston rod 16 to move to the left. When the cam bar 13 drops, the valve 44 moves to the left cutting off air pressure from supply 52, and the valve 42 is returned to the position shown to exhaust the left hand end of the cylinder. The right hand end of the cylinder is vented in any suitable manner.

It will be seen from the foregoing, that when the animal arches her back, prior to evacuation, the bar 13 will be lifted applying pressure to the cylinder 14. Movement of the piston rod 16, connected to the receiver or hopper 19 as by the cable 20, will swing the hopper towards and into contact with the animal's posterior and in position to catch the excrement, it being understood that the animal's tail will naturally rise on such occasion. When the evacuation is completed, the animal's arched back relaxes, allowing the valves to shift, whereupon the receiver 19 swings away from the animal. Thus the unsanitary conditions often present in stables are eliminated.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A dairy stable sanitary apparatus comprising in combination, with an animal stall having an overhead support extending lengthwise of the stall, an animal waste receiver suspended at the rear of said stall from said support, said receiver being located at a height above the floor of the stall and being adapted to be swung from a freely suspended position, to a position forward thereof and in engagement with the posterior of an animal confined within the stall, power actuated means extending lengthwise of the stall and mounted on said support, and having operative connection with said suspended receiver for swinging said suspended receiver to said position forward in said stall, sensory means carried by said support and located centrally of said stall and positioned to be engaged by and adapted to be moved upward by an animal's back when rising in response to an arching reflex, and means associated with said sensory means and actuated by the upward movement of said sensory means in response to an arching reflex for controlling the application of power to said power-actuated means, whereby to swing said receiver forward to a posterior engagement position of an animal confined within said stall.

2. A dairy stable sanitary apparatus comprising in combination, with an animal stall having an overhead support extending lengthwise of the stall, an animal waste receiver suspended at the rear of said stall from said support, said receiver being located at a height above the floor of the stall and being adapted to be swung from a freely suspended position, to a position forward thereof and in engagement with the posterior of an animal confined within the stall, power-actuated means extending lengthwise of the stall and mounted on said support and having operative connection with said suspended receiver for swinging said suspended receiver to said position forward in said stall, sensory means carried by said support and located centrally of said stall, and positioned to be engaged by and adapted to be moved upward by an animal's back when rising in response to an arching reflex, means associated with said sensory means and actuated by the upward movement of said sensory means in response to an arching reflex for controlling the application of power to said power-actuated means, whereby to swing said receiver forward to a posterior engagement position of an animal confined within said stall, and means operatively connected with and for elevating said sensory means, controlling means, power-actuated means and receiver to provide a clear path for an animal to enter or leave said stall from the rear thereof.

3. A dairy stable sanitary apparatus comprising in combination, with an animal stall having an overhead support extending lengthwise of the stall, an animal waste receiver suspended at the rear of said stall from said support, said receiver being located at a height above the floor of the stall and being adapted to be swung from a freely suspended position, to a position forward thereof and in engagement with the posterior of an animal confined within the stall, power-actuated means comprising a fluid pressure cylinder and piston extending lengthwise of the stall and mounted on said support, and having said piston operatively connected with said suspended receiver for swinging said suspended receiver to said position forward in said stall, sensory means carried by said support and located centrally of said stall and positioned to be engaged by and adapted to be moved upward by an animal's back when rising in response to an arching reflex, and valve means associated with said sensory means and actuated by the upward movement of said sensory means in response to an arching reflex for controlling the application of fluid pressure to said cylinder, whereby to swing said receiver forward to a posterior engagement position of an animal confined within said stall.

4. A dairy stable sanitary apparatus comprising in combination with an animal stall having an overhead support extending lengthwise of the stall, an animal waste receiver suspended at the rear of said stall from said support, said receiver being located at a height above the floor of the stall and being adapted to be swung from a freely suspended position, to a position forward thereof and in engagement with the posterior of an animal confined within the stall, power-actuated means comprising a fluid pressure cylinder and piston extending lengthwise of the stall and mounted on said support, and having said piston operatively connected with said suspended receiver for swinging said suspended receiver to said position forward in said stall, sensory means carried by said support and located centrally of said stall and positioned to be engaged by and adapted to be moved upward by an animal's back when rising in response to an arching reflex, valve means associated with said sensory means and actuated by the upward movement of said sensory means in response to an arching reflex for controlling the application of fluid pressure to said cylinder, whereby to swing said receiver forward to a posterior engagement position of an animal confined within said stall, and means operatively connected with and for elevating said sensory means, controlling means, power-actuated means and receiver to provide a clear path for an animal to enter or leave said stall from the rear thereof.

References Cited in the file of this patent
UNITED STATES PATENTS

| | | |
|---|---|---|
| 568,788 | Parker | Oct. 6, 1896 |
| 599,763 | Burnes | Mar. 1, 1898 |
| 1,097,667 | Pfeifer | May 26, 1914 |
| 1,175,773 | Khoubesserian | Mar. 14, 1916 |
| 2,623,498 | Gustavsson | Dec. 30, 1952 |

FOREIGN PATENTS

| | | |
|---|---|---|
| 515,154 | Germany | Dec. 29, 1930 |